C. J. SHACKLEFORD.
VEHICLE WHEEL.
APPLICATION FILED FEB. 18, 1915.
1,158,314.
Patented Oct. 26, 1915.
3 SHEETS—SHEET 3.
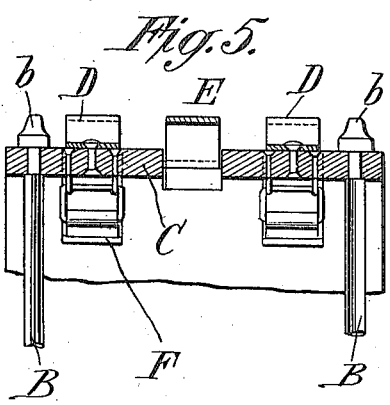
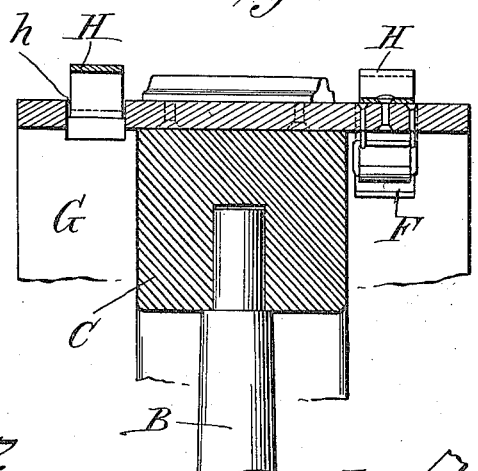
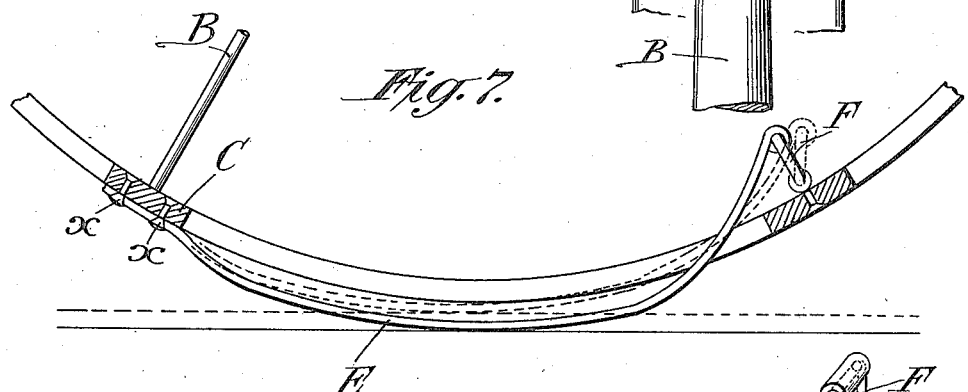
Witnesses:
Inventor:
C. J. Shackleford.
By his Attorneys:

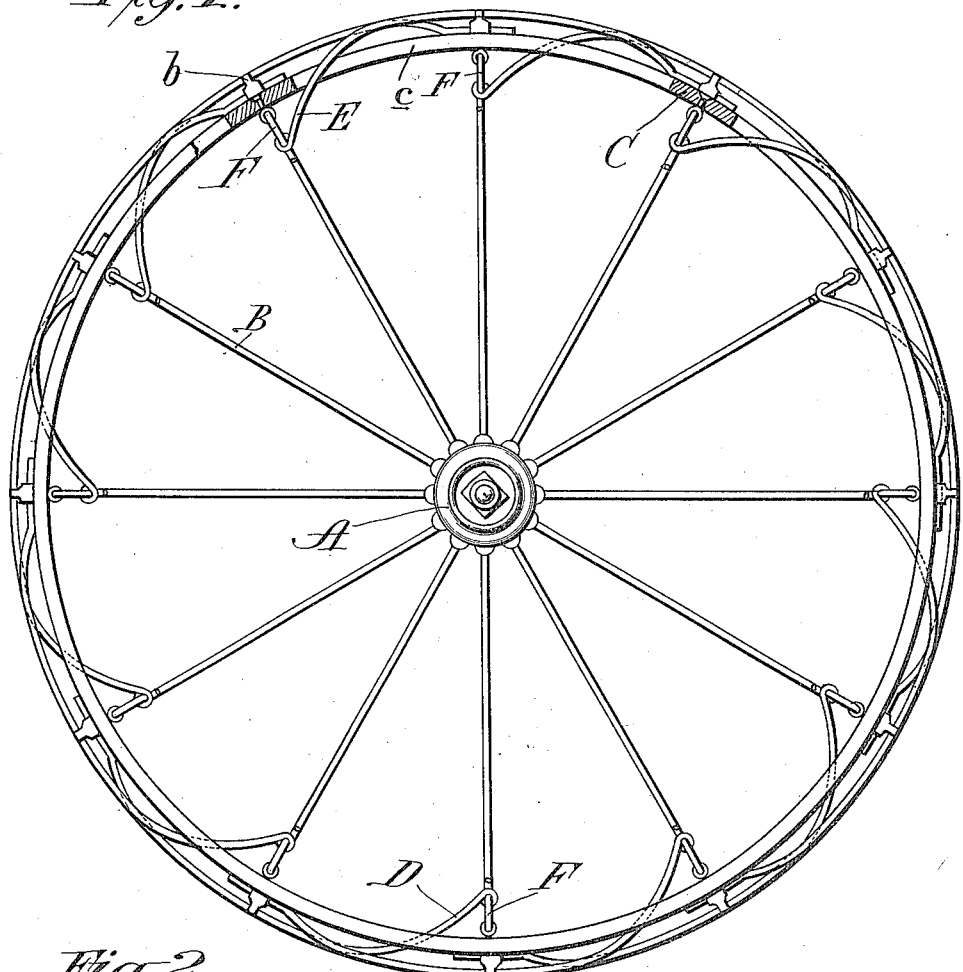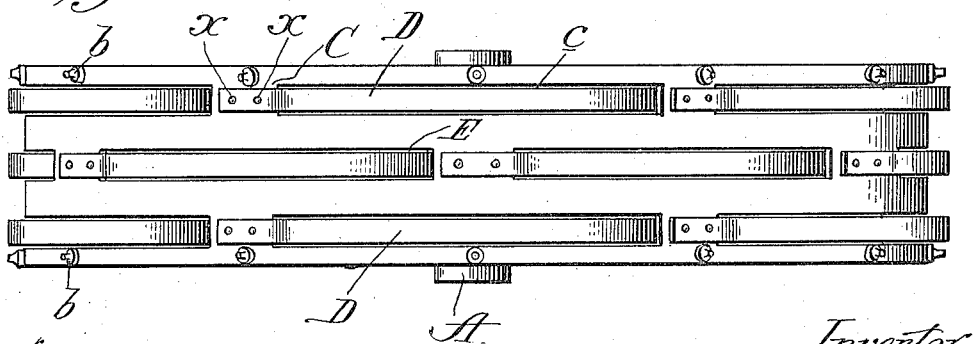

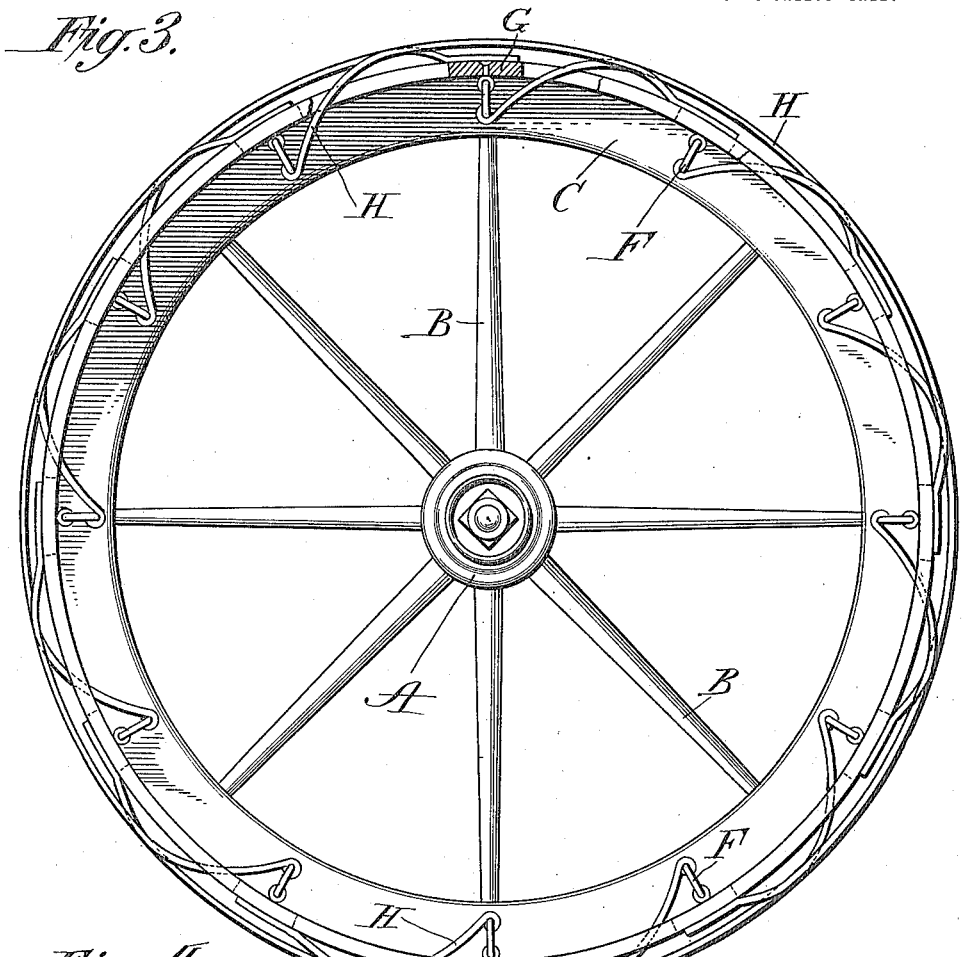
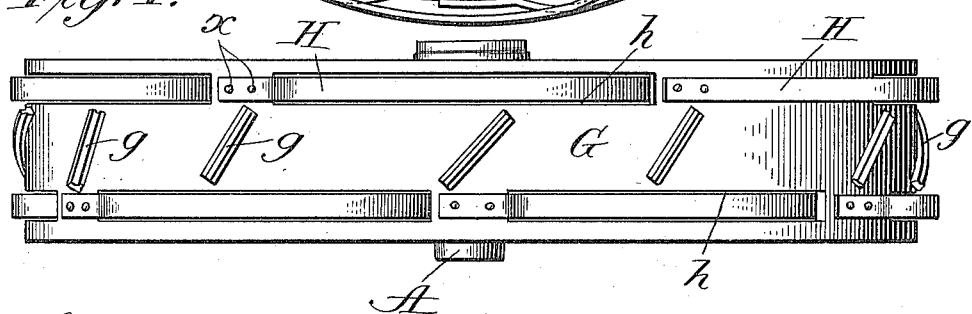

UNITED STATES PATENT OFFICE.

CHARLES J. SHACKLEFORD, OF NELSON, MISSOURI.

VEHICLE-WHEEL.

1,158,314.                Specification of Letters Patent.         Patented Oct. 26, 1915.

Application filed February 18, 1915. Serial No. 9,064.

*To all whom it may concern:*

Be it known that I, CHARLES J. SHACKLEFORD, a citizen of the United States, residing in Nelson, in the county of Saline and State of Missouri, have invented certain new and useful Improvements in Vehicle-Wheels, of which the following is a specification.

The object of this invention is to provide a vehicle wheel of improved construction which shall have the desired resiliency for easy riding, shall absorb or reduce shocks, have the necessary tractive power and non-skidding properties and yet while strong and durable shall be simple and inexpensive in construction.

Rubber or pneumatic tires are now largely used, but these are expensive, are not durable and are liable to punctures and other accidents.

A wheel made in accordance with my invention has a tire provided with arched metallic leaf springs arranged on the periphery of the wheel and adapted to run along the ground and expand and contract while traversing the road.

In one form of my invention the wheel comprises a metallic hub and metallic spokes which are attached to a metallic rim which is formed with a series of slots through which the springs extend. The ends of the spokes extend through the rim and provide projections which serve to prevent the wheel from skidding or slipping and to improve the tractive power of the wheel. Each spring has one end attached to the outside of the rim near the end of a slot while the opposite end of the spring extends through the slot and may be connected with the inside of the rim by a swinging link or may be left free if preferred. Each spring is arranged across the slot from one end thereof to the other and when the spring is compressed it moves through the slot and keeps it clear of mud, gravel, etc. In another form of the invention the hub and spokes may be made of wood or other suitable material and the spokes are attached at their outer ends to a rim or felly of wood to the exterior of which is attached a slotted tire having springs applied thereto in the manner above described. In this case two rows of springs are employed and they operate in the slots of the rim on opposite sides of the felly.

In the accompanying drawings, Figure 1 shows a side elevation of a vehicle wheel embodying my improvements, parts being broken away to better illustrate other parts. Fig. 2 is a top plan view thereof. Fig. 3 shows a side elevation of another form of vehicle wheel with my improvements applied, parts being broken away to illustrate other parts. Fig. 4 is a top plan view of the same. The remaining figures are on an enlarged scale. Fig. 5 is a detail view in section showing parts of the wheel illustrated in Fig. 1. Fig. 6 is a detail view in section showing parts of the wheel shown in Fig. 3. Fig 7 is a detail view illustrating on an enlarged scale how the springs are applied to the rim of the wheel. Fig. 8 is a perspective view of one of the springs.

The wheel shown in Figs. 1 and 2 comprises a hub A, spokes B and a rim C. These may all be made of metal and the spokes are made to project through the rim near the opposite sides thereof and are secured in place by fastening devices $b$ which so project from the rim as to afford means to prevent slipping and skidding and to provide additional tractive power to the wheel. The rim is formed with slots $c$. Three series of slots are preferably used and these are preferably all of the same length but are made to overlap as shown, *i. e.*, the slots in the two series at the sides of the rim, while of the same length and having their ends in line with each other, have their middle portions in line with the ends of the middle series of slots. There are two series of springs D applied to the rim over the side slots and a single series of springs E applied to the rim over the middle slots. Each of these springs is curved or arched as shown and has one end secured at $x$ to the outside of the rim near the end of a slot and has its opposite end extended through the same slot near the opposite end thereof. This latter end of the spring may be left free, but preferably it is connected with the inner side of the rim by a swinging link F which, while flexible and permitting the inner end of the spring to freely move, prevents too much movement thereof. The springs D and E are so arranged that they are adapted to come in contact with the ground and form the tread of the wheel. They move freely through the slots, keep the latter free from mud, gravel, etc., and when compressed serve to close the slots. The springs are so arranged that parts of two or more springs rest on the ground at all times, distribute the load and render the wheel easy running.

In Fig. 3 the hub and spokes B are shown as being made of wood and the outer ends of the spokes are attached to a wooden felly or rim C. In this case I apply a tire or rim G of metal to the felly C and said tire G may be provided with ribs or projections $g$ to provide tractive power and prevent slipping and skidding. The springs H are similar to those before described, but two sets of springs only are employed. They are secured to the tire at $x$ and extend through the slots in the manner before explained. The slots $h$ for receiving the springs are all of the same length but those on one side of the rim have their ends out of line with the ends of the slots on the opposite sides thereof so that parts of two springs may always be in contact with the ground.

While I have shown one form of my invention involving the use of three sets or series of springs, and another form involving the use of two sets or series of springs, it will be understood that the number of series of springs employed on each wheel may be varied, but each series of springs should be curved or arched as shown and each spring should extend through a slot or opening in the tire or rim in order that it may have freedom of movement and in order that mud, gravel or the like may not impede its operation. A wheel constructed in the manner before described will resist or relieve all shocks to which the vehicle is subjected, it has admirable non-skidding properties and tractive power on all grades, the springs will move freely without undue friction, are strong and durable and not liable to accident. Furthermore the cost of construction is relatively small and the wheel as a whole may be made strong and durable.

I claim as my invention:

1. A vehicle wheel provided with a slotted rim and arched springs each secured at one end to the outside of the rim and extending through a slot therein.

2. A vehicle wheel provided with a slotted rim, arched leaf springs each secured at one end to the outside of the rim and having its opposite end extended through a slot and means for flexibly connecting the inner end of each spring to the rim.

3. A vehicle wheel having a rim formed with a plurality of circular series of slots, the ends of which are out of line with each other and a plurality of series of arched leaf springs each secured to the outside of the rim at one end of the slot and each extending through a slot moving freely therein and having its inner portion free to move back and forth in the slot.

4. A vehicle wheel, comprising a hub, a rim, spokes connecting the hub with the rim and having projections on the outside of the rim, a series of arched springs extending through slots in the rim and free to move therein, means for securing one end of each spring to the outside of the rim and a swinging link connecting the inner end of each spring to the inside of the rim.

In testimony whereof, I have hereunto subscribed my name.

CHARLES J. SHACKLEFORD.

Witnesses:
H. G. TRAY,
R. W. REDD.